US012036560B2

(12) United States Patent
Shimizu et al.

(10) Patent No.: US 12,036,560 B2
(45) Date of Patent: Jul. 16, 2024

(54) THERMAL CYCLER AND REAL-TIME PCR DEVICE INCLUDING SAME

(71) Applicant: HITACHI HIGH-TECH CORPORATION, Tokyo (JP)

(72) Inventors: Hayato Shimizu, Tokyo (JP); Toshiki Yamagata, Tokyo (JP); Yoko Makino, Tokyo (JP); Nobutaka Kumazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 694 days.

(21) Appl. No.: 17/269,677

(22) PCT Filed: Sep. 28, 2018

(86) PCT No.: PCT/JP2018/036250
§ 371 (c)(1),
(2) Date: Feb. 19, 2021

(87) PCT Pub. No.: WO2020/065917
PCT Pub. Date: Apr. 2, 2020

(65) Prior Publication Data
US 2021/0237089 A1 Aug. 5, 2021

(51) Int. Cl.
*B01L 7/00* (2006.01)

(52) U.S. Cl.
CPC ......... *B01L 7/52* (2013.01); *B01L 2300/1822* (2013.01)

(58) Field of Classification Search
None
See application file for complete search history.

(56) References Cited

U.S. PATENT DOCUMENTS 6,558,947 B1 5/2003 Lund et al.
2003/0072685 A1* 4/2003 Goldman ................ B01L 9/523 422/942

(Continued)

FOREIGN PATENT DOCUMENTS

AU 2015210344 A1 8/2015
JP 2010-502228 A 1/2010

(Continued)

OTHER PUBLICATIONS

International Search Report, PCT/JP2018/036250, Jan. 8, 2019 (4 pgs.).

(Continued)

*Primary Examiner* — Brian R Gordon
(74) *Attorney, Agent, or Firm* — Volpe Koenig

(57) ABSTRACT

A thermal cycler includes: a support block configured to support a reaction vessel; a Peltier element thermally connected to the support block and configured to adjust a temperature of a sample solution stored in the reaction vessel by heating/cooling the support block; a temperature sensor configured to measure a temperature of the support block; and a temperature adjusting unit configured to control a current and a voltage supplied to the Peltier element based on the temperature of the support block measured by the temperature sensor. As the reaction vessel, a reaction vessel including a conical portion which opens at an upper portion and tapers toward a lower portion is used, and the Peltier element is arranged so as to be parallel to a conical generatrix portion of the reaction vessel.

8 Claims, 10 Drawing Sheets

(56) References Cited

U.S. PATENT DOCUMENTS

| | | | | |
|---|---|---|---|---|
| 2006/0228268 | A1* | 10/2006 | Heimberg | B01L 7/52 422/130 |
| 2007/0184548 | A1 | 8/2007 | Tan et al. | |
| 2008/0026483 | A1* | 1/2008 | Oldenburg | B01L 7/52 422/400 |
| 2009/0155838 | A1 | 6/2009 | Hale | |
| 2010/0150203 | A1* | 6/2010 | Timmann | G01N 25/00 374/45 |
| 2013/0288873 | A1 | 10/2013 | Barbee et al. | |
| 2014/0038192 | A1* | 2/2014 | Buse | G01N 21/6452 435/6.12 |
| 2014/0130518 | A1 | 5/2014 | Yamaguchi | |
| 2014/0273181 | A1* | 9/2014 | Abbott | G02B 27/0025 359/398 |
| 2014/0273182 | A1 | 9/2014 | Tan et al. | |
| 2016/0144366 | A1 | 5/2016 | Sugiyama et al. | |
| 2018/0037930 | A1 | 2/2018 | Nammoku et al. | |

FOREIGN PATENT DOCUMENTS

| | | | |
|---|---|---|---|
| JP | 2011-505011 | A | 2/2011 |
| WO | 2012/012779 | A2 | 1/2012 |
| WO | 2012/172884 | A1 | 12/2012 |
| WO | 2015/005078 | A1 | 1/2015 |
| WO | 2016/135798 | A1 | 9/2016 |

OTHER PUBLICATIONS

Great Britain Office Action issued on Mar. 28, 2022 for Great Britain Patent Application No. 2101843.7.

International Preliminary Report on Patentability and Written Opinion of the International Search Authority issued on Apr. 8, 2021 for PCT Application No. PCT/JP2018/036250.

* cited by examiner

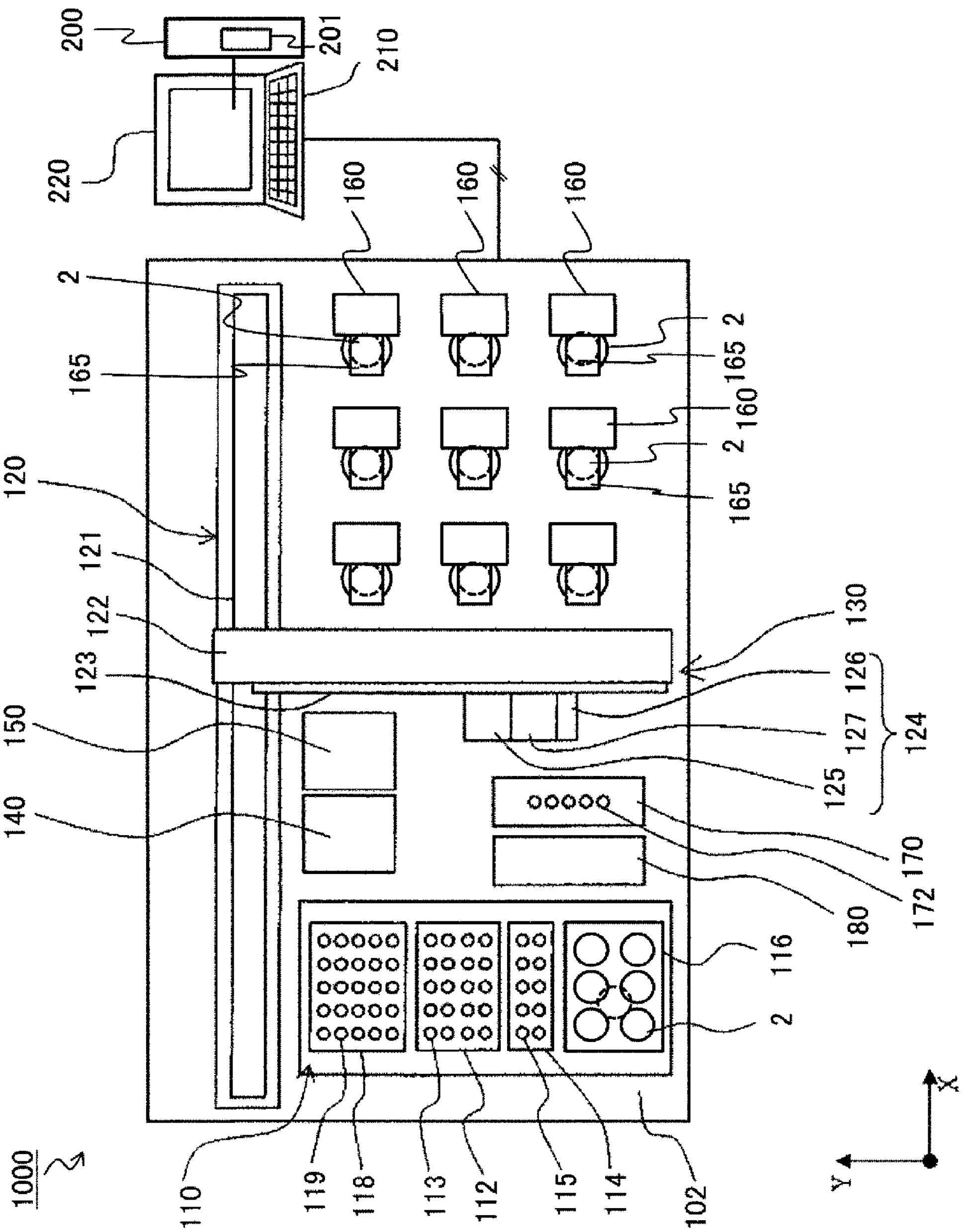
[FIG. 1]

[FIG. 2]
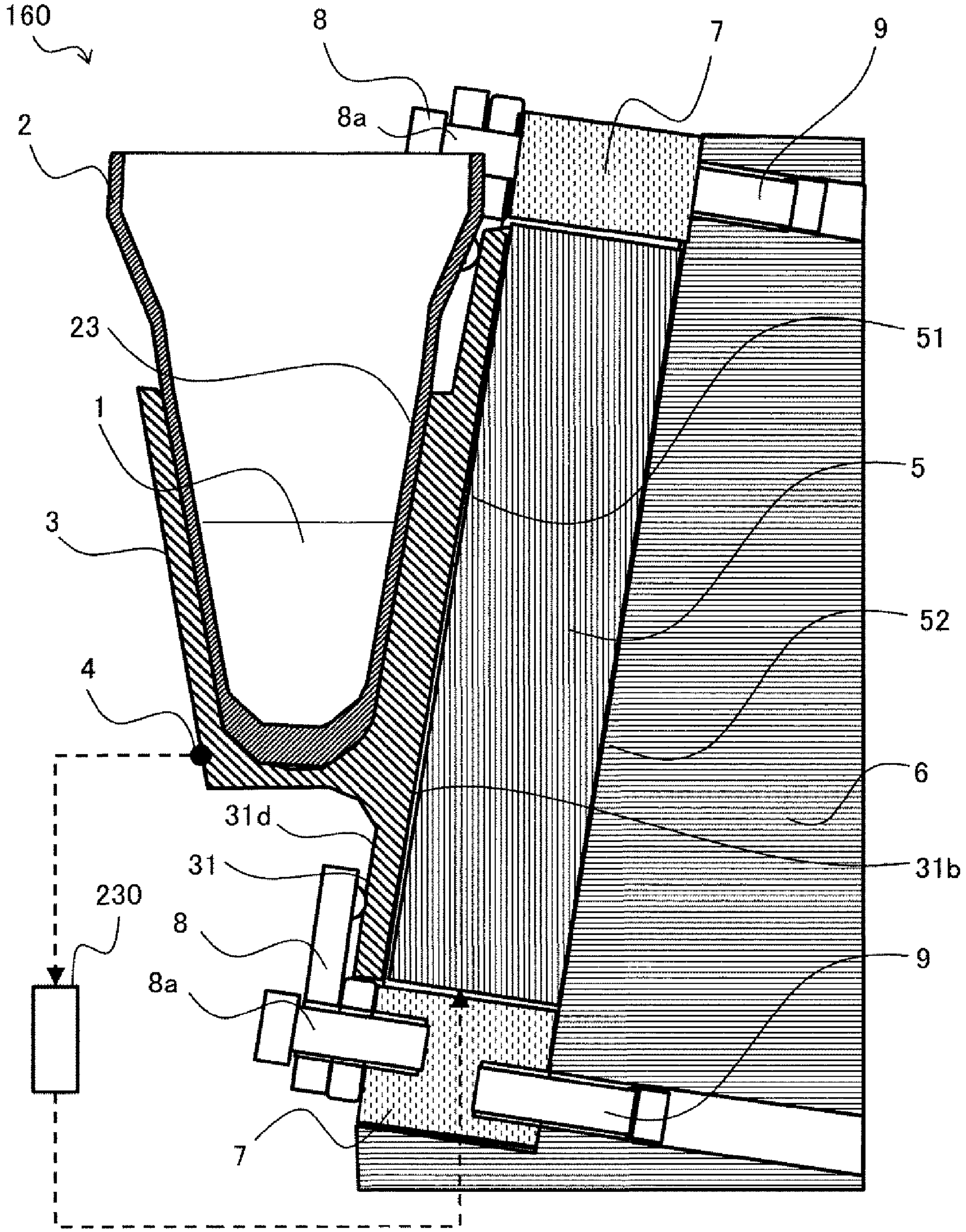

[FIG. 3]
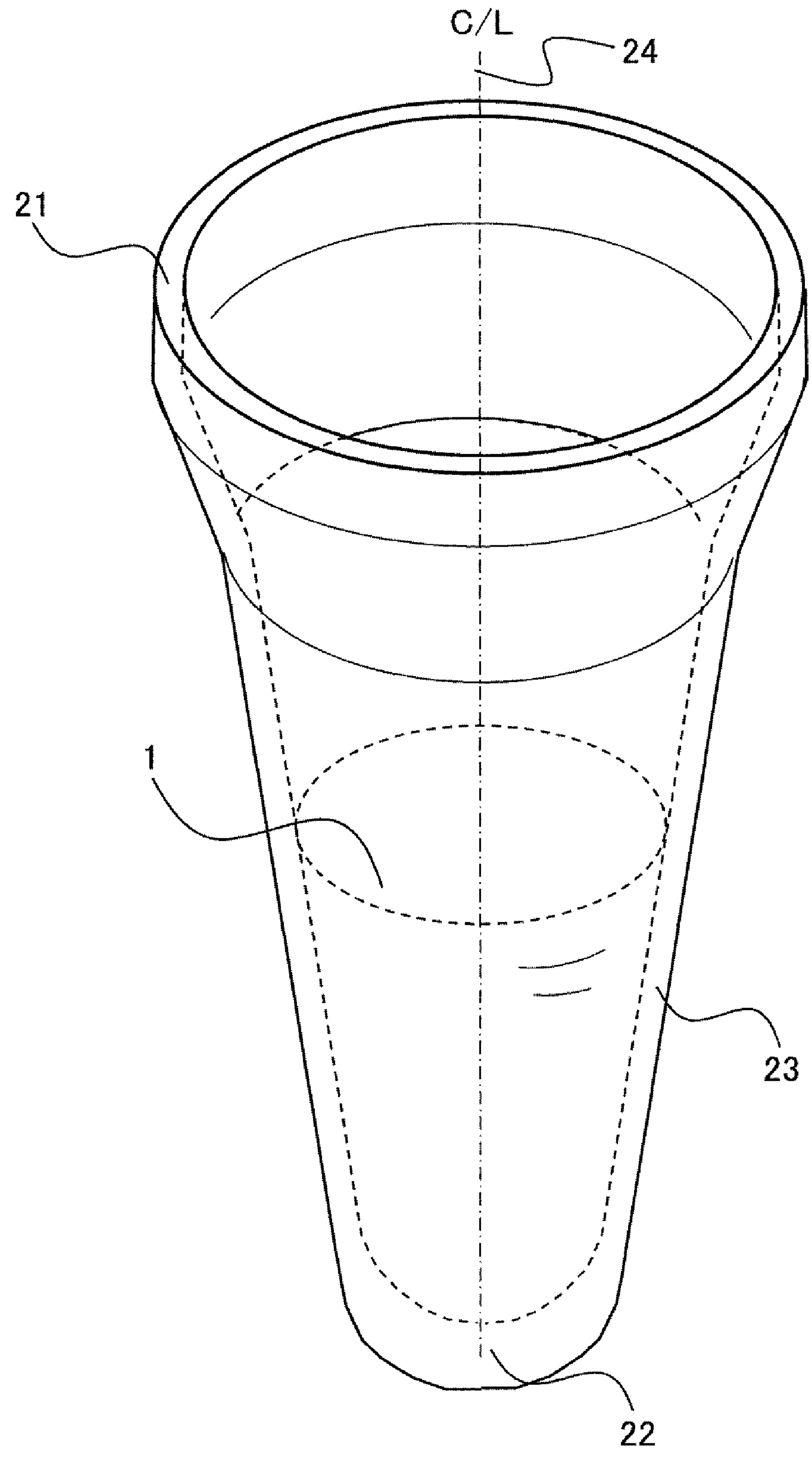

[FIG. 4]
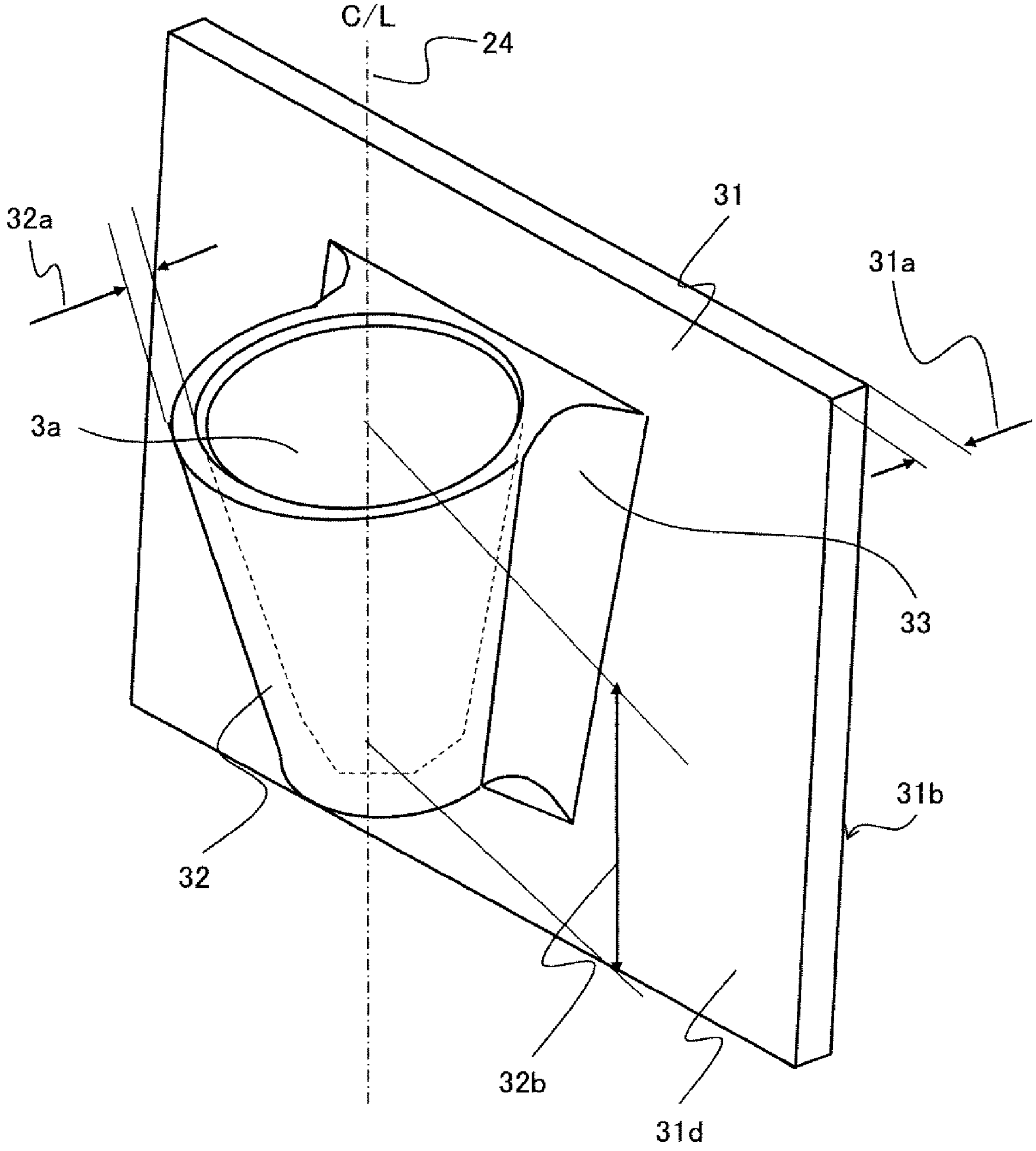

[FIG. 5]
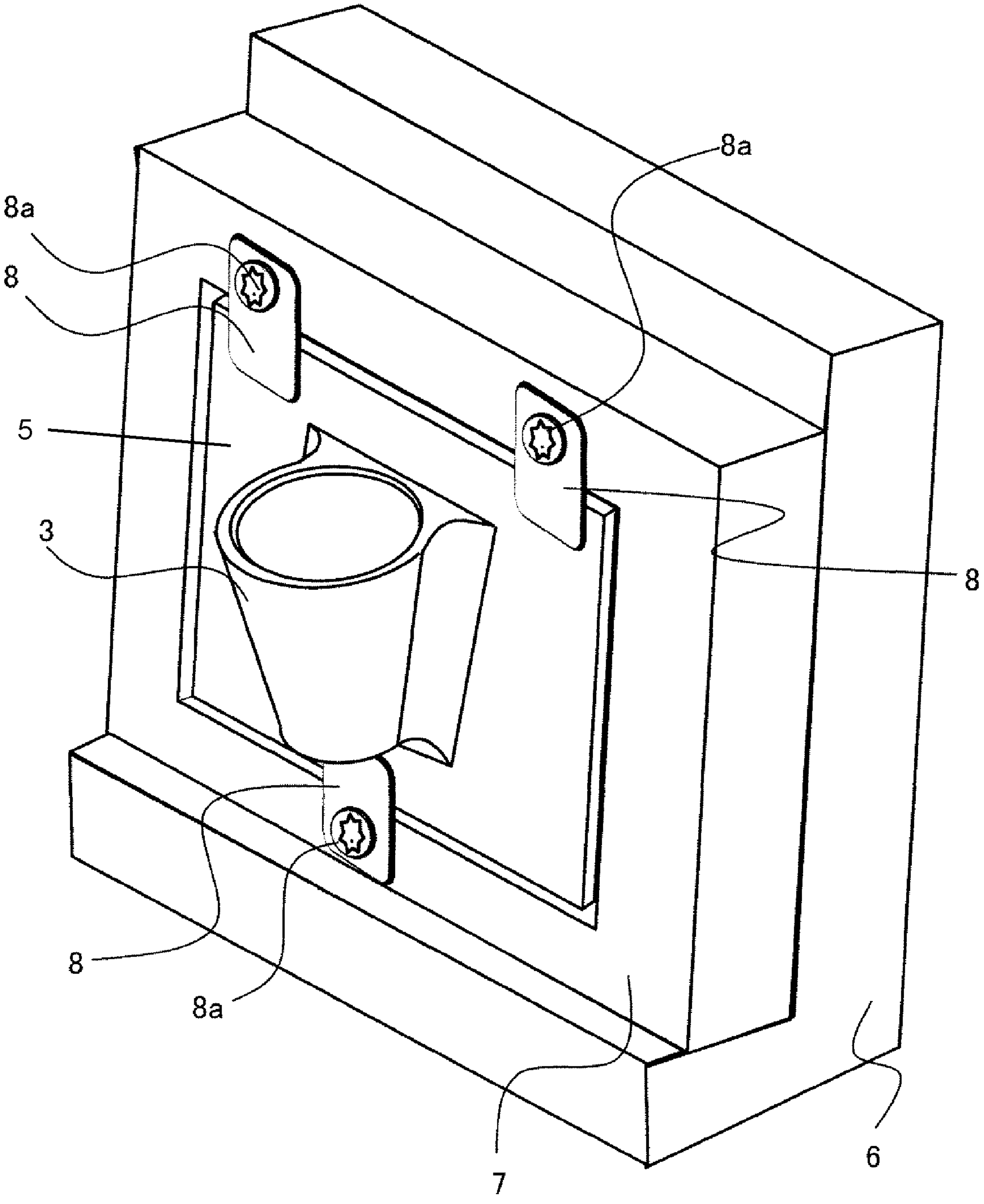

[FIG. 6]
RELATED-ART TECHNIQUE
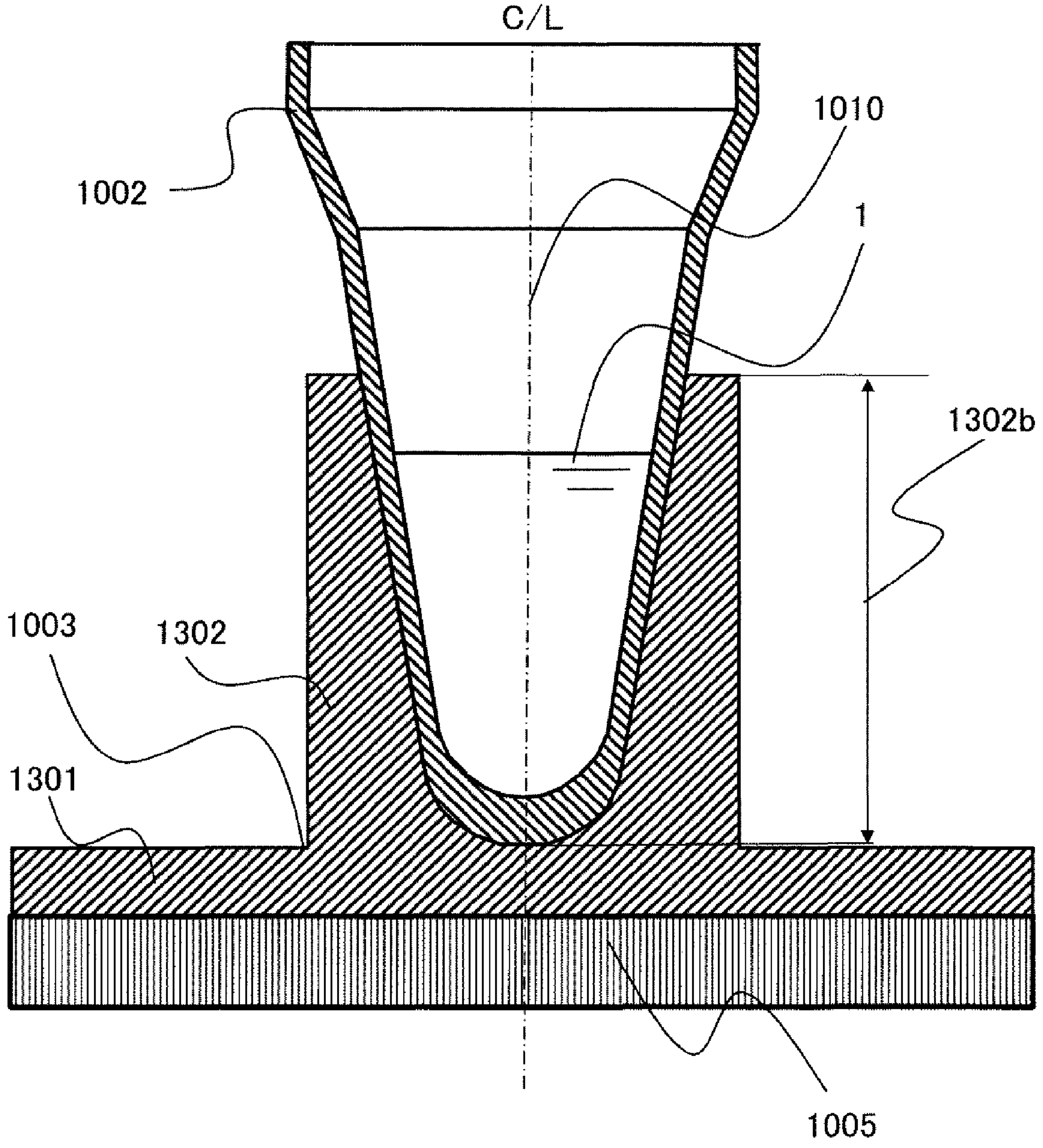

[FIG. 7]
RELATED-ART TECHNIQUE
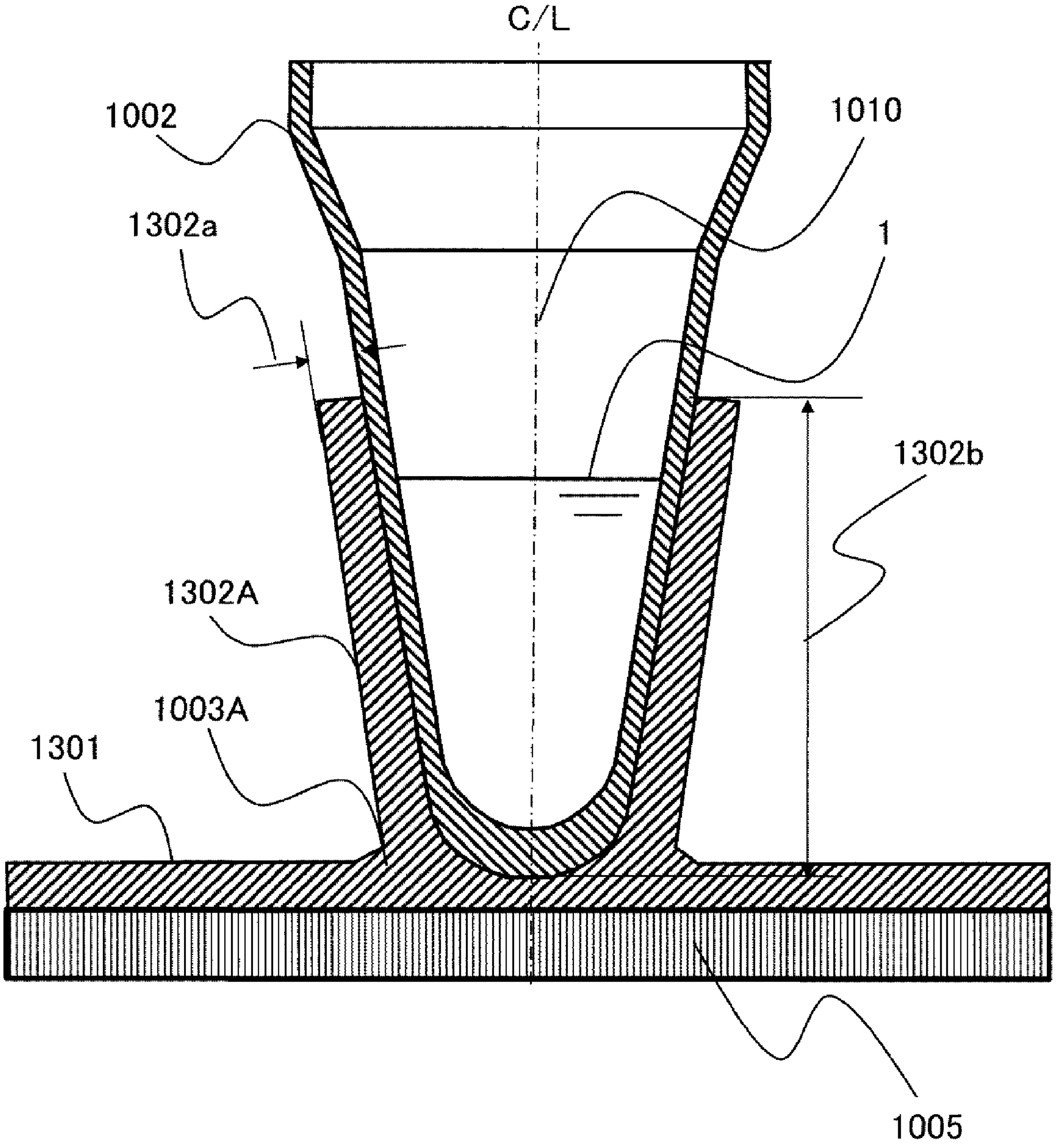

[FIG. 8]
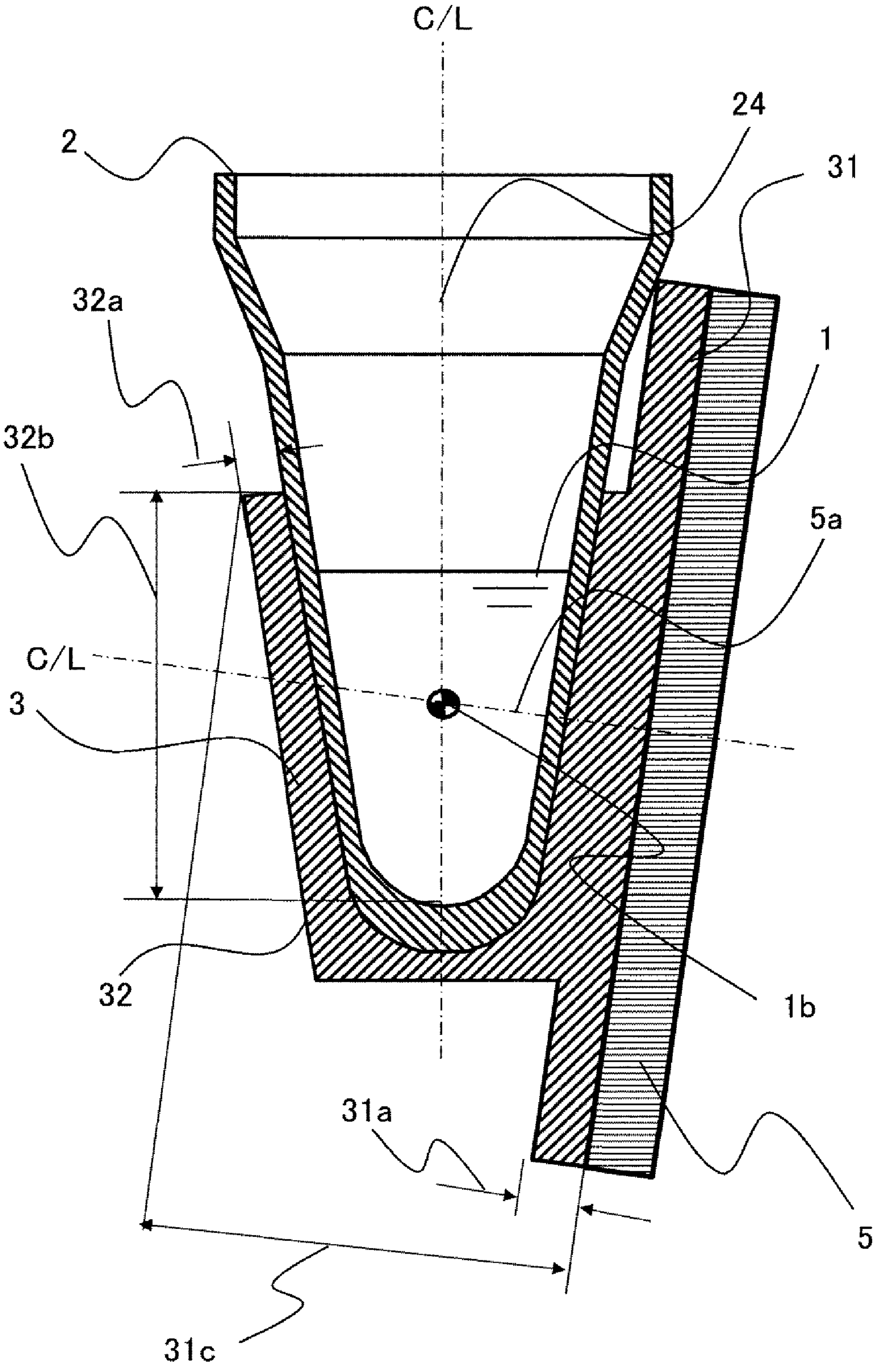

[FIG. 9]
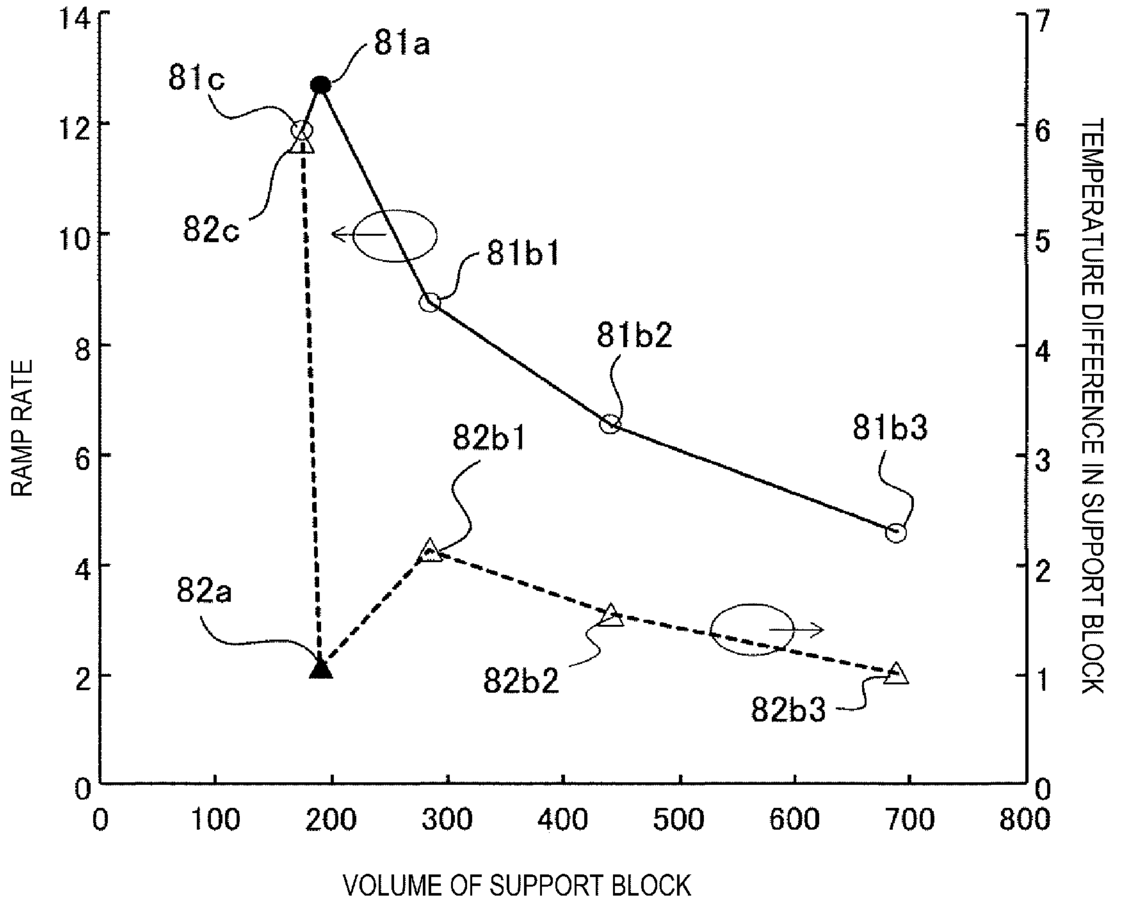

[FIG. 10]
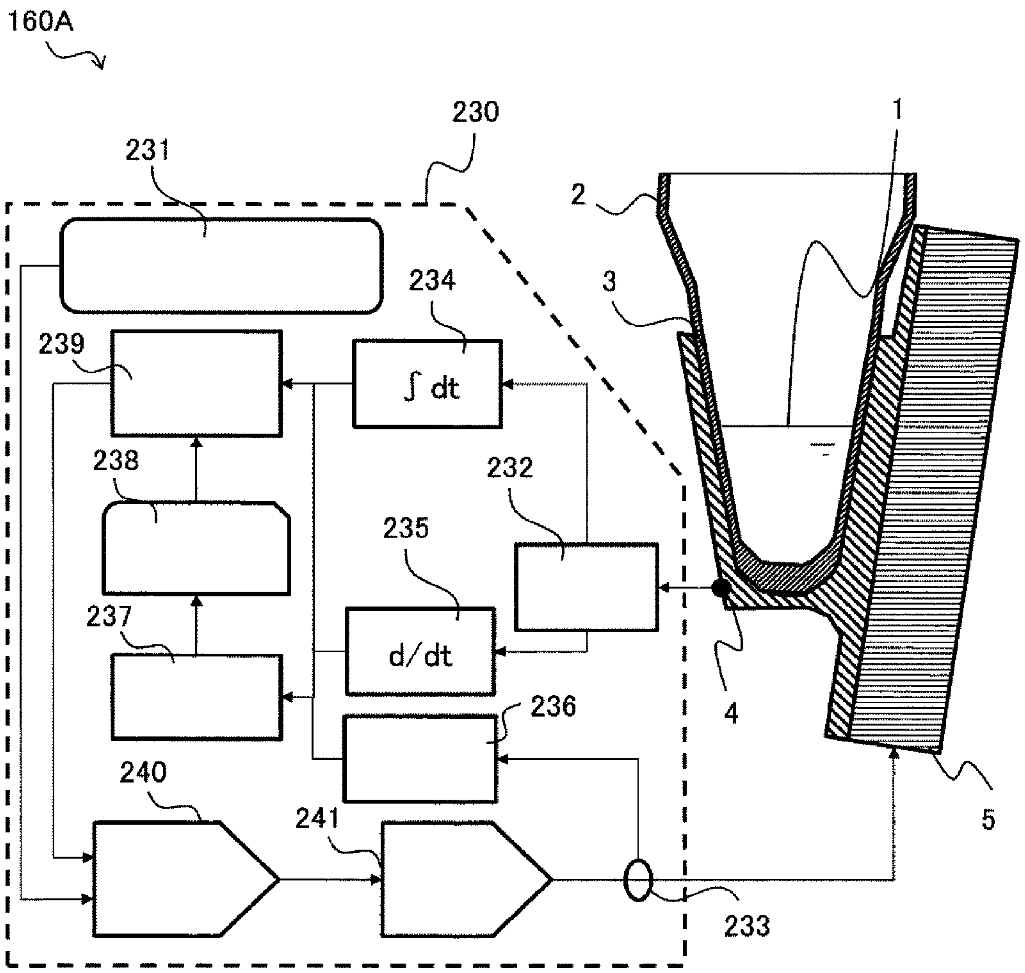

THERMAL CYCLER AND REAL-TIME PCR DEVICE INCLUDING SAME

TECHNICAL FIELD

The present invention relates to a thermal cycler suitable for a real-time PCR device which analyzes a nucleic acid contained in a specimen derived from a living body such as blood and urine, that is, a so-called biological sample, and a real-time PCR device including the thermal cycler.

BACKGROUND ART

As an example of a real-time PCR device in which, in order to prevent a decrease in analytical performance due to partial overheating for a reaction solution and to shorten an analysis time by improving a temperature change speed of the reaction solution, temperature control matching an analysis item or characteristics of a configuration of the device is set and executed by performing a simple operation, PTL 1 discloses that, when performing overshooting, by executing a first processing of continuously raising a temperature to a target overshoot temperature, a second processing of, after reaching the temperature, holding the target overshoot temperature for a preset period of time until an overshoot maintenance time is reached, and a third processing of continuously reducing the temperature to a target temperature of the reaction solution, controlling is performed such that a temperature measurement value shows a trapezoidal waveform.

For the purpose of maintaining stable temperature adjustment performance for each of a plurality of reaction vessels storing a reaction solution and minimizing a variation in temperature even if an environment temperature of a place where the device is installed is different within a certain range, PTL 2 discloses that, with a configuration in which a reaction vessel which stores a reaction solution and a portion which directly or indirectly performs temperature control on the reaction vessel are covered with a cover and a fin cover, which have a heat insulating structure, and further a heat source for controlling an internal temperature of an internal space covered with the cover is included, the internal temperature is kept constant, and the influence of the environment temperature on the temperature control over the reaction vessel is minimized.

CITATION LIST

Patent Literature

PTL 1: WO 2016-135798
PTL 2: WO 2015-005078

SUMMARY OF INVENTION

Technical Problem

In the related art, examples of a nucleic acid amplification technique used for performing inspection on a nucleic acid contained in a specimen derived from a living body include a technique using a polymerase chain reaction (hereinafter referred to as PCR) method. In the PCR method, a temperature of a reaction solution obtained by mixing a specimen and a reagent is controlled according to a predetermined condition and thereby a desired base sequence in the reaction solution can be selectively amplified.

In addition, as other nucleic acid amplification methods, constant-temperature amplification methods in which the temperature of the reaction solution is controlled to be constant to amplify nucleic acid have been developed, such as a NASBA (nucleic acid sequence-based amplification) method and a LAMP (loop-mediated isothermal amplification) method.

Such a nucleic acid amplification method is also actively used in diagnosis of viral infections, and clinical inspection, and is required to improve efficiency, labor saving, and high accuracy of the inspection by automation.

PTL 1 discloses that, in order to prevent the decrease in analytical performance due to partial overheating for the reaction solution and to shorten the analysis time by improving the temperature change speed of the reaction solution, a temperature control method matching the analysis item or the characteristics of the configuration of the device.

PTL 2 discloses a nucleic acid amplification detection device which can maintain stable temperature adjustment performance for each of a plurality of reaction vessels storing a reaction solution and minimize the variation in temperature even if the environment temperature of the place where the device is installed is different within a certain range.

The real-time PCR devices disclosed in PTLs 1 and 2 have a configuration in which a temperature adjustment block that supports a reaction vessel is installed along a circular outer edge of a carousel that can rotate around a rotation shaft, and a Peltier element is arranged as a temperature adjustment device for each temperature adjustment block between the carousel and the temperature adjustment block.

In such a configuration, when a fluorescence analysis device or a dispensing mechanism is fixed at a fixed position in a circumferential direction of the carousel, the temperature can be adjusted independently and in parallel at an adjustment temperature for an adjustment time according to a protocol of each amplification target. Therefore, it is possible to perform processes corresponding to a plurality of protocols in which individual nucleic acid analyses are simultaneously performed on a large number of types of specimens.

In the real-time PCR device described in PTL 1, a sample solution can be irradiated with excitation light from below the reaction vessel for fluorescence analysis, and fluorescence is detected with a photoreceiver provided on a radial outer side of the circular carousel.

The real-time PCR device described in PTL 2 has a configuration in which a lower portion of the reaction vessel protrudes downward from the temperature adjustment block, and the fluorescence analysis can be performed by using a fluorescence analysis device located below the reaction vessel via the protruding bottom of the reaction vessel.

In any case, in configurations of PTLs 1 and 2 in which a plurality of temperature adjustment blocks are suspended on the carousel, a part of the reaction vessel where the sample solution is stored is largely exposed to air due to observation with the fluorescence analysis device. This is because the fluorescence analysis device is fixed and fluorescence measurement is performed from a side or a lower side of the reaction vessel.

In the techniques described in PTLs 1 and 2, a reaction vessel having a narrow lower tip end, but having most parts in a circular or quadrangular tubular shape, is used. This is because it is necessary to prevent complicated scattering of light in order to measure fluorescence intensity from the side or the lower side of the reaction vessel.

Further, the real-time PCR devices described in PTLs 1 and 2 are designed to ensure a volume of an individual temperature adjustment block as much as possible. Therefore, individual temperature adjustment blocks are arranged in the carousel in the circumferential direction. This is because the temperature adjustment block is considered as an incubator. In this way, when the volume of the temperature adjustment block is increased, it is possible to provide characteristics that heat capacities of the temperature adjustment blocks are increased and the temperature is unlikely to change due to external disturbance when the sample solution is kept at a constant temperature.

Here, in clinical inspection, there is a demand for promptly obtaining inspection results of specimens.

In the PCR method, since the time to keep the temperature constant is determined by a protocol, it is necessary to quickly change from one constant temperature to a next constant temperature in order to obtain inspection results quickly. Therefore, it is necessary to improve a ramp rate, which is a rate of change in temperature of the temperature adjustment block.

As described in PTLs 1 and 2, when a method in which a fluorescence intensity measurement system moves using a fixed temperature adjustment block is adopted instead of the configuration in which the specimen is held on the carousel and the carousel is rotated and moved to above a measurement system, the fluorescence intensity can be measured from above, and it is not necessary to use a transparent reaction vessel. This makes it possible to use a material having a good thermal conductivity for the reaction vessel, and enables a rapid temperature change.

In the reaction vessel that has a tubular shape as described in PTLs 1 and 2, a gap need to be provided between the reaction vessel and the temperature adjustment block in order to facilitate detachment. However, since this gap becomes heat transfer resistance, it is disadvantageous for the rapid temperature change. In contrast, when a method of measuring the fluorescence intensity from above is adopted, advantages that the reaction vessel can be formed into a downwardly tapered conical shape and the reaction vessel can be easily detached even if being in close contact with the temperature adjustment block can be obtained.

Further, an effect that the control of the Peltier element can be optimized if the time change of the temperature of the sample solution can be known is obtained. Here, since it is difficult to measure the temperature of the sample solution during a reaction, the temperature of the sample solution is predicted based on the temperature of the temperature adjustment block obtained from a temperature sensor. For this purpose, it is desired that a temperature difference caused by locations in the temperature adjustment block is not large when the temperature changes. Since the Peltier element has a thermal stress distribution when a large temperature difference is formed in a heat transfer surface, it is desirable not to provide a large temperature difference.

Therefore, the problem to be solved by the invention is to provide a thermal cycler that can improve a ramp rate of a support block and reduce a temperature difference in the support block when the temperature changes over time in a real-time PCR device which includes a reaction vessel having a downwardly tapered conical shape and measures fluorescence intensity from above, and a real-time PCR device including the thermal cycler.

Solution to Problem

The invention includes a plurality of means for solving the above problems. For example, an aspect relates to a thermal cycler including: a support block configured to support a reaction vessel; a Peltier element thermally connected to the support block and configured to adjust a temperature of a sample solution stored in the reaction vessel by heating/cooling the support block; a temperature sensor configured to measure a temperature of the support block; and an input heat amount adjusting unit configured to control a current and a voltage supplied to the Peltier element based on the temperature of the support block measured by the temperature sensor, in which as the reaction vessel, a reaction vessel having a conical portion which opens at an upper portion and tapers toward a lower portion is used, and the Peltier element is arranged so as to be parallel to a conical generatrix portion of the reaction vessel.

Advantageous Effect

According to the invention, it is possible to improve the ramp rate of the support block and reduce the temperature difference in the support block when the temperature changes over time even in a case where the fluorescence intensity is measured from above and the reaction vessel is formed into a downwardly tapered conical shape. Problems, configurations, and effects other than those described above will be further clarified with the following description of embodiments.

BRIEF DESCRIPTION OF DRAWINGS

FIG. 1 is a diagram showing a schematic configuration of a real-time PCR device according to a first embodiment of the invention.

FIG. 2 is a diagram showing a cross section showing a basic structure of a thermal cycler of the real-time PCR device according to the first embodiment of the invention.

FIG. 3 is an external view showing an example of a reaction vessel used in the thermal cycler of the real-time PCR device according to the first embodiment of the invention.

FIG. 4 is an external view showing an example of a support block used in the thermal cycler of the real-time PCR device according to the first embodiment of the invention.

FIG. 5 is an external view showing an example of an assembled state of the thermal cycler of the real-time PCR device according to the first embodiment of the invention.

FIG. 6 is a cross-sectional view showing an example of a support block of a thermal cycler of a real-time PCR device in the related art for comparison.

FIG. 7 is a cross-sectional view showing an example of a support block of a thermal cycler of a real-time PCR device in the related art for comparison.

FIG. 8 is a cross-sectional view showing an example of the support block of the thermal cycler of the real-time PCR device according to the first embodiment of the invention.

FIG. 9 is a diagram showing a simulation result of a ramp rate and a maximum temperature difference due to a shape of the support block of the thermal cycler of the real-time PCR device according to the first embodiment of the invention and a shape of the support block of the thermal cycler in the related art.

FIG. 10 is a block diagram illustrating a temperature control system of a thermal cycler of a real-time PCR device according to a second embodiment of the invention.

DESCRIPTION OF EMBODIMENTS

Embodiments of a thermal cycler and a real-time PCR device including the thermal cycler of the invention will be described below with reference to the drawings.

First Embodiment

A thermal cycler and a real-time PCR device including the thermal cycler according to a first embodiment of the invention will be described below with reference to FIGS. 1 to 9.

FIG. 1 is an overall diagram showing a schematic configuration of the real-time PCR device according to the first embodiment of the invention.

A real-time PCR device 1000 shown in FIG. 1 includes a rack mounting portion 110, a transport mechanism 120, a liquid dispensing mechanism 130, a lid unit 140, an agitation unit 150, a control device 200, a thermal cycler 160, and a measuring unit 165.

In the real-time PCR device 1000, a solution preparation unit configured to prepare a sample solution 1 (see FIG. 2) includes the rack mounting portion 110, the transport mechanism 120, the liquid dispensing mechanism 130, and the lid unit 140.

The rack mounting portion 110 is a region in which a specimen, a reagent, a dispensing tip, and a reaction vessel 2 used for inspection are disposed. The rack mounting portion 110 is provided at a predetermined position on a working table 102 of the real-time PCR device 1000, and mounted with a specimen vessel rack 112, a reagent vessel rack 114, a reaction vessel rack 116, and a nozzle tip rack 118.

A plurality of specimen vessels 113 each storing a specimen containing a nucleic acid as a target of an amplification process are housed in arrays in the specimen vessel rack 112. A plurality of reagent vessels 115 each storing a reagent to be added to each specimen are housed in arrays in the reagent vessel rack 114. A plurality of unused empty reaction vessels 2 used for mixing the specimen and the reagent are housed in arrays in the reaction vessel rack 116. A plurality of unused nozzle tips 119 used for dispensing the specimen and the reagent are housed in arrays in the nozzle tip rack 118.

The transport mechanism 120 is a mechanism that moves each portion in the real-time PCR device 1000 while holding the reaction vessel 2 or the like, includes an X-axis direction guide 121, an X-axis direction mover 122, a Y-axis direction guide 123, and a Y-axis direction mover 124, and has a configuration in which the Y-axis direction mover 124 can be moved two-dimensionally on a working table based on a control signal and arranged at a desired position on the working table.

The X-axis direction guide 121 is a guide arranged so as to extend in an X-axis direction in FIG. 1 on the working table 102 of the real-time PCR device 1000. The X-axis direction mover 122 is a mover provided so as to be movable on the X-axis direction guide 121.

The Y-axis direction guide 123 is a guide that is integrally attached to the X-axis direction mover 122 and is arranged so as to extend in a Y-axis direction in FIG. 1. The Y-axis direction mover 124 is a mover provided so as to be movable on the Y-axis direction guide 123.

The Y-axis direction mover 124 is provided with a barcode reader 125, a gripper unit 126, and a dispensing unit 127, which move integrally with the Y-axis direction mover 124 on the working table and arranged at desired positions on the working table 102.

The barcode reader 125 reads identification information attached to each of the specimen vessel 113, the reagent vessel 115, and the reaction vessel 2, and acquires the identification information.

The gripper unit 126 grips or releases the reaction vessel 2 in response to an operation of a gripper based on the control signal, and transports the reaction vessel 2 while the Y-axis direction mover 124 moves between parts of the device on the working table 102.

The dispensing unit 127 has a configuration in which the nozzle tip 119 can be detached. The dispensing unit 127 mounts the nozzle tip 119 from the nozzle tip rack 118 based on the control signal, immerses the nozzle tip 119 in the specimen in the specimen vessel 113 or the reagent in the reagent vessel 115, and sucks the specimen or the reagent into the nozzle tip 119 for collection. The dispensing unit 127 discharges and dispenses the specimen or the reagent stored in the nozzle tip 119 into the reaction vessel 2 based on the control signal.

This dispensing unit 127 forms a main part of the liquid dispensing mechanism 130, which is a mechanism configured to prepare a sample solution by dispensing a specimen and a reagent into one selected reaction vessel 2 using a dispensing tip.

In the real-time PCR device 1000, on the working table 102 between the rack mounting portion 110 and the thermal cycler 160, a sample solution preparation position 170 is formed in which an unused reaction vessel 2 taken out from the reaction vessel rack 116 for preparing the sample solution is to be placed.

The sample solution preparation position 170 is provided with a vessel mounting unit 172 for holding the reaction vessel 2. In the real-time PCR device 1000, a specimen and a reagent are dispensed from the specimen vessel 113 and the reagent vessel 115 using the dispensing unit 127 into the unused reaction vessel 2 transferred from the reaction vessel rack 116 to the reagent preparation position 170 using the gripper unit 126, and a sample solution in which the specimen and the reagent are mixed is prepared in the reaction vessel 2. A plurality of vessel mounting units 172 are provided. Accordingly, for example, the same specimen or the same reagent can be dispensed into a plurality of reaction vessels 2 at the same time, and a batch process in which a plurality of sample solutions are prepared can be performed.

The lid unit 140 is a mechanism that covers the reaction vessel 2 storing the sample solution. The lid unit 140 covers an opening of the reaction vessel 2 storing the sample solution, which is transferred from the sample solution preparation position 170 by using the gripper unit 126, to prevent evaporation of the sample solution, entry of foreign matters from the outside and the like.

The agitation unit 150 is a mechanism that uniformly mixes the specimen and the reagent of the sample solution stored in the reaction vessel 2. The agitation unit 150 agitates the sample solution stored in the closed reaction vessel 2 transferred from the lid unit 140 using the gripper unit 126, and mixes the specimen and the reagent.

In the illustrated real-time PCR device 1000, on the working table 102 between the sample solution preparation position 170 and the rack mounting portion 110, a disposal box 180 for discarding a used nozzle tip 119 mounted on the dispensing unit 127 and used for dispensing a specimen or a reagent or the inspected reaction vessel 2 that has been subjected to a nucleic acid amplification process by the thermal cycler 160 is provided.

The thermal cycler 160 is a mechanism in which the reaction vessel 2 after agitation is mounted and a nucleic acid of the sample solution 1 is amplified according to a predetermined protocol, the details of which will be described later.

The measuring unit 165 is arranged on an upper side of the reaction vessel 2 storing the sample solution 1, and is a mechanism for measuring a nucleic acid concentration by measuring a fluorescence characteristic of the sample solution 1 whose temperature has been adjusted by the thermal cycler 160 according to a protocol predetermined.

The measuring unit 165 includes an excitation light source that irradiates an exposed bottom vessel portion of the opposite reaction vessel 2 with excitation light, and a detection element that detects fluorescence from the sample solution based on irradiation with the excitation light. Examples of the excitation light source include a light emitting diode (LED), a semiconductor laser, a xenon lamp, a halogen lamp, and the like. Examples of the detection element include a photodiode, a photomultiplier, a CCD, and the like.

Accordingly, the measuring unit 165 can detect and measure, by the detection element, the fluorescence generated from the sample solution 1 by the irradiation with the excitation light from the excitation light source, and at the same time quantify base sequence of an amplification target fluorescently labeled with the reagent in the sample solution 1 sample solution.

An operation of each part of the device including the thermal cycler 160 of the real-time PCR device 1000 configured in this way is controlled by the control device 200 including an input device 210 such as a keyboard and a mouse and a display device 220 such as a liquid crystal monitor, as shown in FIG. 2.

The control device 200 controls each part of the above-mentioned device including the thermal cycler 160 of the real-time PCR device 1000, and performs a nucleic acid inspection process including a sample solution preparation process and a nucleic acid amplification process by using various types of software and the like stored in advance in a storage unit 201 based on a protocol set by the input device 210. In addition, the control device 200 stores in the storage unit 201 a movable state of each part of the device during the nucleic acid inspection process, stores in the storage unit 201 an analysis result such as a fluorescence detection result obtained by the thermal cycler 160, and displays the analysis result on the display device 220.

The control device 200 of the present embodiment is configured to enable temperature control of a plurality of thermal cyclers 160 independently and in parallel.

Next, the above-mentioned sample solution preparation process and nucleic acid amplification process will be described in detail in relation to the nucleic acid inspection process performed by the control device 200.

Here, the sample solution preparation process refers to a process of preparing the sample solution 1 in which a specimen and a reagent are mixed in the reaction vessel 2 in the nucleic acid inspection process performed by the control device 200 of the real-time PCR device 1000. In addition, the nucleic acid amplification process refers to a process of the thermal cycler 160 adjusting a temperature of the sample solution 1, which is prepared in the reaction vessel 2 by this sample solution preparation process, according to a protocol depending on a type of a base sequence as an amplification target, and performing nucleic acid amplification on the base sequence while confirming fluorescence measurement of the sample solution 1 by the measuring unit 165.

At the start of the sample solution preparation process, the control device 200 first initializes various work areas for the sample solution preparation process provided in the storage unit 201.

When completing the initialization related to the preparation process of the sample solution 1, the control device 200 reads specimen vessel rack information, reagent vessel rack information, and execution content information of the nucleic acid inspection set by the input device 210.

The control device 200 selectively extracts, from one or more individual nucleic acid inspection processes included in the execution content information of the nucleic acid inspection, one or more individual nucleic acid processes to be subjected to the sample solution preparation process this time based on a procedure set in advance.

Next, the control device 200 prepares the sample solution 1 at the sample solution preparation position 170 by controlling the operation of the liquid dispensing mechanism 130 with respect to the untreated reaction vessel 2 previously transported from the reaction vessel rack 116 and mounted on the vessel mounting unit 172 of the sample solution preparation position 170 based on sample solution preparation process information of the selectively extracted individual nucleic acid process.

Next, the configuration and operation of the thermal cycler 160, which constitutes a main part for efficiently processing different analysis items in a short time in the real-time PCR device 1000 according to the present embodiment configured as described above, will be described in detail with reference to FIGS. 2 to 9.

FIG. 2 is a cross-sectional view showing a basic structure of the thermal cycler 160 of the present embodiment.

The thermal cycler 160 of the present embodiment is a mechanism that adjusts a current applied to a Peltier element 5 by a temperature adjusting unit 230 while observing a temperature of a temperature sensor 4 to change the temperature of the sample solution 1 according to a target protocol. The thermal cycler 160 shown in FIG. 2 includes a support block 3, the temperature sensor 4, the Peltier element 5, a heat sink 6, a heat insulation spacer 7, a block fixing member 8, a fastening screw 9, and the temperature adjusting unit 230.

The sample solution 1 is prepared by dispensing and mixing liquids such as a specimen sample, a diluting solution, and a reagent by using the solution preparation unit described with reference to FIG. 1, and is stored in the reaction vessel 2.

The support block 3 includes a holder portion 32 (see FIG. 4) in which a holder hole 3*a* (see FIG. 4) having a shape same as an outer shape of the reaction vessel 2 is formed, a heat receiving plate 31 that is thermally connected to the holder portion 32 and forms a heat receiving surface 31*b* for transferring heat by being in close contact with a heat transfer surface 51 of the Peltier element 5, and a fillet 33 (see FIG. 4).

The reaction vessel 2 is supported by the holder hole 3*a* of the support block 3.

One surface (heat receiving surface 31*b*) of the heat receiving plate 31 is in contact with the Peltier element 5, and the other surface 31*d* is formed with the holder portion 32 that supports the reaction vessel 2.

In the support block 3, the Peltier element 5 capable of cooling/heating periodically changes the temperature of the sample solution 1 according to a PCR protocol of each reaction via the holder portion 32 that supports the reaction vessel 2 and the heat receiving plate 31.

During this period, the sample solution 1 is irradiated with light and the fluorescence intensity is measured. Among these, a part related to sample solution preparation, transport, and fluorescence intensity measurement does not contribute significantly to improving a ramp rate, so the configuration is not particularly limited, and as shown in FIG. 1, it is desirable to introduce the sample solution 1 and measure the fluorescence intensity from above the reaction vessel 2.

In addition, the PCR protocol is also optional and is not limited. Usually, in a temperature range of about 50° C. to 100° C., which is higher than an environmental temperature or a room temperature at which the real-time PCR device is installed, a temperature change pattern in which two or three target temperatures are held for a certain period of time is repeated for a specified number of times.

The temperature sensor 4 is attached to the support block 3, and indirectly measures the temperature of the sample solution 1 by measuring the temperature of the support block 3. The temperature sensor 4 includes, for example, a thermocouple, and a semiconductor thermometer, but is not particularly limited thereto.

The temperature adjusting unit 230 controls a current and a voltage supplied to the Peltier element 5 such that the temperature of the support block 3 measured by the temperature sensor 4 matches a temperature set in advance according to the PCR protocol. Although a case where the control device 200 and the temperature adjusting unit 230 are separate from each other is described, the control device 200 and the temperature adjusting unit 230 may be integrated with each other.

In the above-mentioned PTLs, a combination of the support block 3 and the Peltier element 5 is called a temperature adjustment block.

FIG. 3 is a diagram showing the reaction vessel 2 used in the thermal cycler 160 of the present embodiment.

The reaction vessel 2 used in the thermal cycler 160 is a disposable type that is discarded at the end of the inspection, and is usually made of plastic. As shown in FIG. 3, regarding the shape, the reaction vessel 2 includes a conical portion in which an upper portion 21 opens and a portion housed in the support block 3 tapers toward a lower portion such that the reaction vessel 2 can be thermally in close contact with the support block 3 and can be easily detached therefrom.

The reaction vessel 2 is supported by the support block 3 such that a central axis 24 of the conical portion is substantially in a vertical direction. A tapered tip end 22 of the conical portion is rounded into a nearly spherical shape for thermal adhesion and ease of detachment. The tip end 22 is vertically downward and the upper portion 21 of the reaction vessel 2 on the opposite side opens, so that the sample solution 1 can be introduced and fluorescence intensity after irradiation with light from above can be measured.

Although not shown in the present embodiment, as described above, a transparent lid can be used on the upper portion 21 of the reaction vessel 2 in order to prevent the sample solution 1 from evaporating and disappearing during the PCR reaction.

Any shape may be provided except for the portion in contact with the support block 3, and for example, a flange for aligning with an additional support member, a heater for preventing dew condensation on the disappearance prevention lid described above, or the like can be further provided.

In PTLs 1 and 2 described above, since an optical system is configured to observe fluorescence from a side, it is not possible to use a conical surface with which light scattering is complicated in the reaction vessel, and it is necessary to have a shape of a straight cylinder or prism in the vertical direction.

Therefore, there is a restriction that a gap must be provided between the support block and the reaction vessel in order to facilitate the detachment of the reaction vessel. There is also a restriction that it is necessary to provide a region where the support block and the reaction vessel are not in close contact with each other in order to ensure a lateral optical path. Therefore, there are still some portions where thermal adhesion cannot be obtained, and there is room for improving the ramp rate.

In PTL 2, since a tip end of the reaction vessel mainly storing the sample solution needs to protrude from the support block, there is room for improving the ramp rate as well.

FIG. 4 is an external view showing an example of the support block used in the thermal cycler 160 of the present embodiment.

As shown in FIG. 4 and as described above, the support block 3 is a component in which the holder portion 32 and the heat receiving plate 31 are integrally shaped on a surface opposite to a surface of the heat receiving plate 31 in contact with the Peltier element 5.

Since the support block 3 is a permanent component and is desired to have good strength to withstand the detachment of the reaction vessel 2 and good thermal conductivity, the entire support block 3 is usually made of a metal material having good thermal conductivity, for example, a metal having good thermal conductivity such as aluminum.

A method of manufacturing the support block 3 is not particularly limited. The holder portion 32 and the heat receiving plate 31 may be processed separately and joined by welding or diffusion joining, or be pressure-cast using a mold such that the holder portion 32 and the heat receiving plate 31 are integrated with each other. Alternatively, the holder portion 32 and the heat receiving plate 31 may be cut out from one metal piece by cutting or electric discharge machining.

In order to minimize a volume of the support block 3, the holder portion 32 that covers the conical reaction vessel 2 with a constant thickness 32*a* is arranged on a side opposite to the heat receiving surface 31*b* of the heat receiving plate 31 in contact with the Peltier element 5, which covers the flat plate Peltier element 5 with a constant thickness 31*a*, such that a generatrix portion of the holder portion 32 and the heat receiving plate 31 overlap each other. Accordingly, in order to make a temperature distribution on the heat transfer surface 51 of the Peltier element 5 or the surface in contact with the reaction vessel 2 uniform, it is possible to cover the surface with a thermally conductive material having a constant thickness.

When an additional volume of the fillet 33 as shown in FIG. 4 is added due to processing, it is desirable to reduce a cross-sectional area of the support block 3 equidistant from the heat transfer surface of the Peltier element 5 or the heat receiving plate 31 as a distance increases.

As representative dimensions of each portion, the thickness 32*a* from the holder hole 3*a* to the outer shape of the holder portion 32 and the thickness 31*a* of the heat receiving plate 31 are specified.

The reaction vessel 2 is inserted into the holder portion 32 along the central axis 24 of the holder by an insertion depth 32*b* from an upper end of the holder portion 32.

A shape of an inside of the holder portion 32 is almost the same as the shape of the reaction vessel 2, but a small hole for allowing air and spilled droplets to escape can be provided.

Here, when a temperature distribution in the support block 3 is reduced, performance of the Peltier element 5 can be maximized on the heat receiving surface 31*b* side. In addition, when a temperature distribution of the holder portion 32 is reduced, it is possible to obtain effects that a deviation in liquid temperature of the sample solution 1 can be reduced and the reaction in the sample solution 1 can be made uniform.

When examining a heat balance during temperature adjustment of the support block 3, heat transferred to the sample solution 1 through the reaction vessel 2 is usually one tenth or less of heat input from or heat removed from the Peltier element 5. Examples of other heat include some heat transferred to other components in contact with the support block 3 and the surrounding atmosphere, but most of the heat is used to change the temperature of the support block 3.

Therefore, it can be seen that if the heat obtained by heating and absorption of the Peltier element 5 is constant, the ramp rate can be improved by reducing the heat capacity of the support block 3. It can also be seen that in order to reduce the heat capacity of the support block 3 made of the same material, the volume of the support block 3 should be reduced.

Due to a structure, the thermal conductivity of the sample solution 1 or the reaction vessel 2 is about 1/100 of that of the material of the support block 3.

Therefore, it is considered that the thickness 32*a* of the holder portion 32 should be about 1/100 of the wall thickness of the reaction vessel 2 and a constant thickness around the holder hole 3*a*.

It is considered that the thickness 31*a* of the heat receiving plate 31 in a direction perpendicular to the heat receiving surface 31*b* may also be about 1/10 of the wall thickness of the reaction vessel 2.

In practice, for the purpose of improving the durability of the Peltier element 5 and being able to be processed to maintain shape in terms of strength and improving durability, it is desirable that, the thickness 31*a* is equal to or greater than a thickness dimension, which is a ratio of a contact thermal resistance with the Peltier element 5 to a heat transfer coefficient of the material constituting the support block 3, (contact thermal resistance ($m^2K/W$))×material thermal conductivity (W/mK))>thickness), or the thickness 31*a* is equal to or greater than a minimum wall thickness at which a maximum temperature difference in the heat receiving surface 31*b* is greater than a temperature difference between the heat transfer surfaces 51, 52 of the Peltier element 5 on a high temperature side and the heat transfer surfaces 51, 52 of the Peltier element 5 on a low temperature side, or the thickness 31*a* is equal to or greater than a minimum wall thickness at which the shape of the heat receiving plate 31 can be maintained.

Since the Peltier element 5 and the heat receiving plate 31 are in close contact with each other, it is desirable that the heat receiving surface 31*b* of the heat receiving plate 31 has a shape and an area same as those of the heat transfer surface 51 of the Peltier element 5.

As described above, by not making the area of the heat receiving plate 31 extremely smaller than the area of the heat transfer surface 51 of the Peltier element 5, it is possible to prevent a part of the heat transfer surface 51 of the Peltier element 5 exposed to air from becoming large. Therefore, it is possible to prevent thermal stress from being generated due to an uneven temperature distribution in the surface of the Peltier element 5, and to ensure the durability of the Peltier element 5. Since the area of the heat receiving plate 31 is not extremely larger than the area of the heat transfer surface 51 of the Peltier element 5, it is possible to prevent heating and cooling of objects other than the support block 3.

The Peltier element 5 is a member that is thermally connected to the support block 3 and configured to adjust the temperature of the sample solution 1 stored in the reaction vessel 2 by heating/cooling the support block 3, and is arranged so as to be parallel to a conical generatrix 23 portion of the reaction vessel 2. The Peltier element 5 is not necessary to be strictly parallel to the conical generatrix 23 portion, and a deviation of about ±5 degrees is allowed.

Examples of the Peltier element 5 include a Peltier element having a small thickness in a heat transfer direction and having rectangular or square heat transfer surfaces 51, 52. The other characteristics, composition, and the like are not particularly limited, and an appropriate compound can be used according to the required ramp rate, and for example, a bismuth tellurium ($Bi_2Te_3$) compound or the like is used.

The heat transfer surface 51 of the Peltier element 5 is in contact with the support block 3, and the heat transfer surface 52 is in contact with the heat sink 6. It is desirable that heat transfer grease or thermally conductive grease is applied to these heat transfer surfaces 51, 52 for the purpose of improving thermal bonding. The details of the heat transfer grease and the thermally conductive grease are not particularly limited, and it is desirable to use appropriate grease according to characteristics of the Peltier element 5 and the support block 3 to be used.

The maximum output of transfer heat (unit watt) between the heat transfer surfaces 51, 52 has been determined in the Peltier element 5, and in the thermal cycler 160 of the present embodiment, the temperature change at this maximum output is the ramp rate.

Returning to FIG. 2, the heat sink 6 is provided for the purpose of keeping the temperature of the heat transfer surface 52 substantially constant regardless of the operation of the Peltier element 5 in order to facilitate control of the Peltier element 5. Therefore, it is desirable that the heat capacity thereof is large enough so that the temperature does not change due to transfer of heat from the Peltier element 5, and it is desirable to use a metal having large thermal conductivity, specific heat, and density and to make the volume thereof larger than those of the Peltier element 5 or the like.

In order to keep the temperature of the heat sink 6 close to an environmental temperature such as room temperature, a heat dissipation fin can be provided on a surface of the heat sink 6 other than a surface thereof in contact with the Peltier element 5. It is possible to keep the temperature of the heat sink 6 to be higher than room temperature by taking a method of providing a fan, blowing air at room temperature, or the like.

In the device including a plurality of thermal cyclers 160 of the present embodiment, one large heat sink 6 can be shared by the plurality of thermal cyclers 160.

The heat insulation spacer 7 blocks heat dissipation and heat input from the surface other than the heat transfer surfaces 51, 52 of the Peltier element 5, and also serves as a fixed frame for determining positions of the Peltier element 5 and the support block 3. Therefore, it is desirable that the heat receiving plate 31 of the support block 3 and the Peltier element 5 can be accommodated on a plate having a thickness that is a sum of the thickness of the Peltier element 5 and the thickness of the heat receiving plate 31 of the support block 3, and a hole for determining a position of the heat receiving plate 31 or the Peltier element 5 in a plane direction of the plate is provided.

The heat insulation spacer 7 is fixed to the heat sink 6 by the fastening screw 9 shown in FIG. 2. The heat insulation spacer 7 serves as a base for fixing the block fixing member 8 in order to press the support block 3 and the Peltier element 5 against the heat sink 6 by the block fixing member 8.

As the heat insulation spacer 7, a material having thermal conductivity lower than that of the support block 3 or the heat sink 6, such as heat-resistant plastic or ceramics is used.

As shown in FIG. 2, when fastening the block fixing member 8 with a fixing screw 8*a*, it is desirable that the fixing screw 8*a* for fixing the block fixing member 8 and the fastening screw 9 are separated in order to ensure heat insulation.

FIG. 5 is an external view showing an example of an assembled state of the thermal cycler 160 of the present embodiment. Although the number of the block fixing member 8 is three in FIG. 5, the block fixing member 8 may be provided in a necessary number such that the support block 3 and the Peltier element 5 do not fall off.

An example (FIG. 8) of the support block of the invention will be described using examples (FIGS. 6 and 7) of a support block in the related art.

FIG. 6 is a cross-sectional view showing an example of a support block of a thermal cycler in the related art for comparison.

A heat receiving plate 1031 of a support block 1003 and a Peltier element 1005 shown in FIG. 6 are horizontally installed to be flat plates in the same horizontal direction and in contact with each other. A holder portion 1302 has a shape of a cylinder or a polygonal pillar, and a central axis 1010 of the holder portion 1302 is located at a center of a heat transfer surface of the Peltier element 1005 in the vertical direction. A reaction vessel 1002 is inserted into the holder portion 1302 by an insertion depth 1302*b*.

Although omitted in FIG. 6, a heat insulation spacer, a block fixing member, a fastening screw, and a heat sink are similarly present in this example, as in the invention shown in FIG. 2. The support block 1003 shown in this example is used in a thermal cycler of an existing type of PCR device that measures fluorescence intensity after irradiation with light from above.

FIG. 7 is also a cross-sectional view showing an example of a support block of a thermal cycler in the related art for comparison.

A support block 1003A shown in FIG. 7 has a positional relation between elements substantially same as those in the support block 1003 described with reference to FIG. 6. The difference is that an outer shape of a holder portion 1302A is not a columnar shape, but a conical shape in which the reaction vessel 1002 is covered with a constant wall thickness 1302*a*. With such a shape, the volume of the support block 1003A can be minimized, so if transfer heat of the Peltier element 1005 is the same, the ramp rate should be maximized.

FIG. 8 is a cross-sectional view showing an example of the support block of the thermal cycler 160 of the present embodiment. Hereinafter, the difference between the form of the support block 1003A in the related art described with reference to FIG. 7 and the form of the support block 3 of the invention will be described.

As shown in FIG. 8, the holder portion 32 of the support block 3 of the present embodiment has a conical shape in which the reaction vessel 2 is covered with the constant thickness 32*a*. This conical shape is arranged such that a center line 5*a* of the Peltier element 5 and the central axis 24 of the reaction vessel 2 intersect a center of gravity 1*b* of the sample solution 1. The holder portion 32 of the support block 3 supports the reaction vessel 2 with respect to the heat receiving plate 31 such that the center of gravity 1*b* of the sample solution 1 stored in the reaction vessel 2 is arranged in the center line 5*a* on a plane region of the heat transfer surface 51 of the Peltier element 5.

As described above, the holder portion 32 is in contact with the heat receiving plate 31 at a portion corresponding to the conical generatrix 23 portion of the reaction vessel 2, but the amount of the sample solution 1 is not always the same. Therefore, as a rough guide, it is desirable that the center of gravity 1*b* of the sample solution 1 is at a position of a center of gravity when an amount of liquid corresponds to an intermediate amount between the maximum amount and the minimum amount of the sample solution 1. That is, it is not necessary to strictly arrange the center of gravity 1*b* of the sample solution 1 in the center line 5*a*, and some error is allowed.

In this way, by arranging the Peltier element 5 diagonally with respect to the vertical direction and along the conical generatrix 23 portion of the reaction vessel 2, the reaction vessel 2 can be supported such that a distance 31*c* from the Peltier element 5 to a farthest portion of the support block 3 is minimized.

Therefore, an instantaneous temperature difference in the support block 3 depending on a heat transfer rate is minimized, and a temperature measured at any location of the support block 3 can match the temperature of the portion of the reaction vessel 2 in contact with the support block 3 with a minimum error.

The Peltier element 5 and the heat receiving plate 31 that substantially covers the Peltier element 5 are square or rectangular. If the Peltier element 5 and the heat receiving plate 31 are rectangular, it is desirable to install short sides of the Peltier element 5 and the heat receiving plate 31 in the horizontal direction because the temperature inside the heat receiving plate 31 tends to be uniform. However, this does not make a big difference, so it may be arranged in any way.

Regarding a positional relation between the holder portion 32 of the support block 3 and the Peltier element 5 described with reference to FIG. 8 above, it may be difficult to maximize the effect when an apex angle of the conical shape of the reaction vessel 2 is larger than 90 degrees. In such a case, the form shown in FIG. 7 may be used, and it is desirable that the apex angle of the conical shape of the reaction vessel 2 is around 20 degrees such that a depth can be ensured even with a small amount of sample solution to measure the fluorescence intensity from above.

FIG. 9 shows a result obtained by calculating a temperature difference in the support block and the ramp rate from a state of temperature change by a numerical heat transfer simulation under the same transfer heat condition. In FIG. 9, conditions have been set to use sample solutions in the same amount, reaction vessels having the same shape, and Peltier elements having the same specification. Conditions have been set to use support blocks having the same insertion depth 32*b* and shapes shown in FIGS. 6 to 8.

With this numerical simulation, an actually measured block temperature can be predicted with an accuracy within ±0.2 degrees, and it is considered that the prediction accuracy is sufficient.

The ramp rate can be obtained by an experiment because the ramp rate is obtained by dividing the temperature difference by a time for a temperature measured by the temperature sensor installed in the support block to change to a set temperature difference, but the temperature difference in the support block cannot be measured because it is a difference between a maximum temperature and a minimum temperature in the block at the moment when the set temperature difference of the ramp rate is reached. Therefore, the temperature difference in the support block has been predicted using this simulation.

In a graph in FIG. 9, a horizontal axis represents the volume of the support block, a vertical axis on a left side of FIG. 9 shows the ramp rate, and a vertical axis on a right side represents the temperature difference in block.

In FIG. 9, a plot 81*a* shows the ramp rate of the support block 3 of the invention shown in FIG. 8, and a plot 82*a* shows a calculation result of the temperature difference in the support block 3 of the invention.

In FIG. 9, plots 81*b*1, 81*b*2, and 81*b*3 are results of the ramp rates on the support block 1003 in the related art shown in FIG. 6, and plots 82*b*1, 82*b*2, and 82*b*3 are results of the temperature difference in the support block 1003 in the related art shown in FIG. 6. Three blocks of the form shown in FIG. 6 have been prototyped, and each has a different volume.

In FIG. 9, plots 81*c* and 82*c* are results obtained for a block in which the thickness 1301*a* of the heat receiving plate 1301A and the wall thickness 1302*a* of the holder portion 1302A in the support block 1003A in the related art shown in FIG. 7 are equal to those of the support block 3 having the results of the plot 81*a* and the plot 82*a* in the form of FIG. 8.

In FIG. 9, the volume in the plot 81*c* or the plot 82*c* are slightly smaller than the volume in the plot 81*a* or the plot 82*a* because of a difference in the volume of the fillet at a joint portion between the heat receiving plate and the holder portion.

As shown in FIG. 9, the smaller the block volume, the larger the ramp rate. The ramp rate of the plot 81*a*, which is an arrangement of the invention, is larger than the ramp rate of the plot 81*c* having substantially the same volume. As shown in the plot 82*b* and the plot 82*c*, the temperature difference in block increases as the block volume decreases, that is, the ramp rate rises, and a temperature measurement value of the temperature sensor installed in the block has an error.

As shown in FIG. 9, it can be seen that the temperature difference in block is clearly smaller in the plot 82*b*, which is the result of the support block 3 of the invention, than in the plot 82*c* having substantially the same volume, and the error of the temperature measurement value of the temperature sensor 4 can be reduced even though the ramp rate is large.

Next, effects of the present embodiment will be described.

The real-time PCR device 1000 of the first embodiment of the invention described above includes the thermal cycler 160 and the measuring unit 165 configured to measure a fluorescence characteristic of the sample solution 1 whose temperature has been adjusted by the thermal cycler 160.

Among these, the thermal cycler 160 includes: the support block 3 configured to support the reaction vessel 2; the Peltier element 5 thermally connected to the support block 3 and configured to adjust the temperature of the sample solution 1 held in the reaction vessel 2 by heating/cooling the support block 3; the temperature sensor 4 configured to measure the temperature of the support block 3; and the temperature adjusting unit 230 configured to control a current and a voltage supplied to the Peltier element 5 based on the temperature of the support block 3 measured by the temperature sensor 4. As the reaction vessel 2, a reaction vessel 2 having a conical portion which opens at the upper portion 21 opens and tapers toward the lower portion is used, and the Peltier element 5 is arranged so as to be parallel to the conical generatrix 23 portion of the reaction vessel 2.

Accordingly, when the reaction vessel 2 is formed into a downwardly tapered conical shape for the method of measuring the fluorescence intensity from above, the ramp rate of the support block 3 can be made larger than the ramp rate in the related art with respect to the constant capacity of the Peltier element 5, and the temperature difference in the support block 3 when the temperature changes over time can be reduced as compared with the case in the related art. By improving the ramp rate of the support block 3, the time related to the temperature adjustment of the PCR device can be shortened, the clinical examination time can be shortened, and convenience of the entire device can be improved.

The support block 3 supports the reaction vessel 2 such that the center of gravity 1*b* of the sample solution 1 stored in the reaction vessel 2 is arranged in the center line 5*a* on the plane region of the heat transfer surface 51 of the Peltier element 5, and supports the reaction vessel 2 such that the distance 31*c* from the heat transfer surface 51 to the farthest portion of the support block 3 is minimized, so that the volume of the support block 3 can be minimized. Therefore, the ramp rate of the support block 3 can be kept larger, and the examination time can be shortened more easily.

Since the support block 3 includes the holder portion 32 in which the holder hole 3*a* having a shape same as the outer shape of the reaction vessel 2 is formed, and the heat receiving plate 31 that is thermally connected to the holder portion 32 and configured to transfer heat to and from the heat transfer surface 51 of the Peltier element 5, the heat can be efficiently transferred from the Peltier element 5 to the support block 3, and the ramp rate can be further improved.

Since the heat receiving surface 31*b* of the heat receiving plate 31 in contact with the Peltier element 5 is made have the shape and area same as those of the Peltier element 5, it is possible to prevent a part of the heat transfer surface 51 of the Peltier element 5 exposed to air from becoming large, and it is possible to prevent thermal stress from being generated due to the uneven temperature distribution in the surface of the Peltier element 5, and to ensure the durability of the Peltier element 5.

Further, since the thickness 31*a* of the heat receiving plate 31 in the direction perpendicular to the heat receiving surface 31*b* is equal to or greater than the thickness dimension, which is the ratio of the contact thermal resistance with the Peltier element 5 to the heat transfer coefficient of the material constituting the support block 3, the thickness 31*a* of the heat receiving plate 31 in the direction perpendicular to the heat receiving surface 31*b* is equal to or greater than the minimum wall thickness at which the maximum temperature difference in the heat receiving surface 31*b* is greater than the temperature difference between the heat transfer surfaces 51,52 of the Peltier element 5 on the high temperature side and the heat transfer surfaces 51,52 of the Peltier element on the low temperature side, and the thickness 31*a* of the heat receiving plate 31 in the direction perpendicular to the heat receiving surface 31*b* is equal to or greater than the minimum wall thickness at which the shape of the heat receiving plate 31 can be maintained, the durability of the Peltier element 5 and the support block 3 can be improved.

Since the support block 3 further includes the fillet 33 configured to connect the holder portion 32 and the heat receiving plate 31, an effect that the temperature difference in the support block 3 can be made smaller can be obtained.

Since the measuring unit 165 of the real-time PCR device 1000 is arranged on the upper side of the reaction vessel 2 storing the sample solution 1, as the reaction vessel 2, a conical reaction vessel having the tapered tip end 22 can be used more easily.

Since the real-time PCR device 1000 is further provided with the solution preparation unit configured to prepare the sample solution 1, the burden on an inspector can be reduced, and the labor required to output the inspection result can be reduced.

A case where the thermal cycler 160 is mounted on the real-time PCR device 1000 has been described in the present embodiment, but the thermal cycler 160 of the present embodiment can be an independent device. In this case, solution preparation and measurement is performed by another device and inspector, or a researcher her/himself.

A case where the real-time PCR device is provided with the solution preparation unit has been described, but only the solution preparation is performed by the inspector or the researcher her/himself, and the nucleic acid analysis can be performed by the real-time PCR device including the measuring unit 165 and the thermal cycler 160 of the present embodiment.

A case where nine thermal cyclers 160 of the present embodiment are mounted on the real-time PCR device 1000 has been described, but the number of the thermal cycler 160 mounted is not particularly limited, and a necessary number of thermal cyclers 160 can be mounted as appropriate.

A positional relation between the thermal cycler 160 and the solution preparation unit or the measuring unit 165 is not limited to the form shown in FIG. 1, and can be changed as appropriate.

Second Embodiment

A thermal cycler and a real-time PCR device including the thermal cycler according to the second embodiment of the invention will be described with reference to FIG. 10. The same components as those in the first embodiment are denoted with the same reference numerals, and the description thereof will be omitted. The same applies to the following embodiment.

FIG. 10 is a block diagram showing a temperature control system of a thermal cycler 160 of the present embodiment.

The thermal cycler 160A shown in FIG. 10 includes the sample solution 1, the reaction vessel 2, the support block 3, the temperature sensor 4, and the Peltier element 5 as in the first embodiment.

As shown in FIG. 10, the temperature adjusting unit 230 includes a real-time PCR control system 231, a temperature data acquisition unit 232 for acquiring real-time block temperature information, a Peltier input current/voltage detection unit 233, a time integration unit 234, a time differentiation unit 235, a transfer heat calculation unit 236, a sample solution heat capacity calculation unit 237, a sample solution temperature calculation unit 239, a PCR cycle controller 240, and a driver power supply 241 in order to differentiate/integrate a time change of the temperature of the support block 3 based on the temperature of the support block 3 measured by the temperature sensor 4, and calculate a heat amount input to the support block 3 based on a current/voltage value input to the Peltier element 5.

Each unit of the temperature adjusting unit 230 is executed based on various programs. These programs are stored in an internal recording medium, an external recording medium, or the like, and read and executed by the CPU.

The control processing of the operation may be integrated into one program, or may be divided into a plurality of programs or a combination thereof. Part or all of the programs may be implemented by dedicated hardware, or may be modularized.

When the sample solution 1 is dispensed into the reaction vessel 2 and a PCR cycle can be started, the temperature adjusting unit 230 executes temperature control.

First, the PCR cycle controller 240 starts the temperature control based on a command from the real-time PCR control system 231.

The PCR cycle controller 240 determines a current operating state of the Peltier element 5 by comparing a current temperature value of the sample solution 1 with a time chart of the PCR cycle and the set temperature of the sample solution 1 and causes the driver power supply 241 of the Peltier element 5 to operate.

When the sample solution 1 has been dispensed, the temperature is close to room temperature, and a temperature set by the PCR cycle is higher than the above temperature. Therefore, a temperature rise operation is always performed at the start. At this point, the heat capacity of the sample solution 1 is unknown. Therefore, the driver power supply 241 supplies a current and a voltage to the Peltier element 5 so as to perform heat transfer to the support block 3 with the maximum capacity of the Peltier element 5.

A state of the temperature change of the support block 3 at this time is sequentially measured by the temperature sensor 4, and is taken as real-time block temperature information.

At the same time, information about the current and the voltage supplied by the driver power supply 241 to the Peltier element 5 is detected by the Peltier input current/voltage detection unit 233, and the transfer heat of the Peltier element, as well as the temperature, is converted into real-time data by the transfer heat calculation unit 236.

The temperature data of the support block 3 acquired by the temperature data acquisition unit 232 is sequentially time-integrated by the time integration unit 234 and sequentially time-differentiated by the time differentiation unit 235. A reciprocal of a time derivative of a temperature when the Peltier element 5 is operating at a constant transfer heat is the ramp rate.

The sample solution heat capacity calculation unit 237 obtains the heat capacity by dividing the ramp rate acquired during the period when the transfer heat of the Peltier element 5 obtained by the transfer heat calculation unit 236 is constant by the transfer heat of the Peltier element 5 obtained by the transfer heat calculation unit 236.

The obtained heat capacity indicates a total heat capacity of the support block 3, the reaction vessel 2, and the sample solution 1. Among these, heat capacities of the support block 3 and the reaction vessel 2 can be obtained in advance because materials and volumes of the support block 3 and the reaction vessel 2 are known. That is, the heat capacity of the sample solution 1 can be obtained by subtracting the heat capacities of the support block 3 and the reaction vessel 2 from the obtained heat capacity. This heat capacity is recorded as sample solution heat capacity temporary storage data 238.

A value of the temperature obtained the time integration unit 234 represents total heat applied to the support block 3, the reaction vessel 2, and the sample solution 1, and is the heat added to the sample solution 1 when divided by the ratio of heat capacity. Therefore, the sample solution temperature calculation unit 239 can calculate the average temperature of the sample solution 1 in real time by performing calculation of the heat using the sample solution heat capacity temporary storage data 238.

From the above, the PCR cycle controller 240 can perform the temperature control based on an accurate temperature of the sample solution 1. Since the accuracy of the temperature of the sample solution 1 obtained as described above is equal to the instantaneous temperature difference in the support block 3, it is premised that the support block 3 having a small temperature difference in block described in the first embodiment described above is used.

Other components and operations are substantially the same as those of the thermal cycler and the real-time PCR device including the thermal cycle according to the first embodiment described above, and details thereof will be omitted.

In the thermal cycler and the real-time PCR device including the thermal cycle according to the second embodiment of the invention, substantially effects same as those of the thermal cycler and the real-time PCR device including the thermal cycle according to the first embodiment described above can also be obtained.

Others

The invention is not limited to the above embodiments, and includes various modifications. The above embodiments have been described in detail for easy understanding of the invention, and are not necessarily limited to those including all the configurations described above.

REFERENCE SIGN LIST

1 sample solution
1*b* center of gravity
2 reaction vessel
3 support block
3*a* holder hole
4 temperature sensor
5 Peltier element
5*a* center line
6 heat sink
7 heat insulation spacer
8 block fixing member
8*a* fixing screw
9 fastening screw
21 upper portion
22 tip end
23 generatrix
24 central axis
31 heat receiving plate
31*a* thickness
31*b* heat receiving surface
31*c* distance
32 holder portion
32*a* thickness
32*b* insertion depth
33 fillet
51, 52 heat transfer surface
81*a* plot
82*a* plot
160, 160A thermal cycler
165 measuring unit
200 control device
230 temperature adjusting unit (input heat amount adjusting unit)
231 real-time PCR control system
232 temperature data acquisition unit
233 Peltier input current/voltage detection unit
234 time integration unit
235 time differentiation unit
236 transfer heat calculation unit
237 sample solution heat capacity calculation unit
238 sample solution heat capacity temporary storage data
239 sample solution temperature calculation unit
240 cycle controller
241 driver power supply
1000 real-time PCR device

The invention claimed is:

1. A thermal cycler comprising:
a reaction vessel containing a volume of a sample solution;
a support block supporting the reaction vessel;
a Peltier element having a rectangular planar surface thermally connected to the support block and configured to adjust a temperature of the sample solution contained in the reaction vessel by heating/cooling the support block;
a temperature sensor connected to the support block and configured to measure a temperature of the support block; and
a temperature adjusting unit connected to the temperature sensor comprising:
a driver power supply connected to the Peltier element and
a cycle controller connected to the driver power supply and for executing a program stored on a recording medium that controls a current and a voltage supplied to the Peltier element by the power driver supply based on the temperature of the support block measured by the temperature sensor,
wherein the reaction vessel has a conical portion which opens at a first end of the reaction vessel and tapers toward a second end of the reaction vessel, the planar surface of the Peltier element is parallel to a generatrix of the conical portion of the reaction vessel, and
wherein the support block supports the reaction vessel such that a center of gravity of the volume of the sample solution stored in the reaction vessel is arranged on a line passing through a center of and orthogonal to the rectangular planar surface of the Peltier element, and the reaction vessel is positioned such that a center line of the conical portion is vertical with respect to a surface of the sample solution contained in the reaction vessel.

2. The thermal cycler according to claim 1, wherein
the support block includes
a holder portion supporting the reaction vessel and the holder portion has an interior shape that is the same as an outer shape of the reaction vessel, and
a heat receiving plate that is thermally connected to the holder portion.

3. The thermal cycler according to claim 2, wherein the heat receiving plate comprises a heat receiving surface that is in contact with the Peltier element and the heat receiving surface of the heat receiving plate has a shape that is the same as a shape of a surface of the Peltier element that is in contact with the heat receiving surface of the heat receiving plate.

4. The thermal cycler according to claim 2, wherein a thickness of the heat receiving plate in a direction perpendicular to a heat receiving surface of the heat receiving plate that is in contact with the Peltier element is equal to or greater than a thickness dimension which is equal to a contact thermal resistance with the Peltier element times a heat transfer coefficient of a material constituting the support block.

5. The thermal cycler according to claim 2, wherein the holder portion has a constant wall thickness where the holder portion is in contact with a wall of the reaction vessel.

6. The thermal cycler according to claim 2, wherein the support block further includes a fillet that connects the holder portion and the heat receiving plate.

7. The thermal cycler according to claim 1, wherein the input heat amount adjusting unit is configured to differentiate/integrate a time change of the temperature of the support block based on the temperature of the support block measured by the temperature sensor, and calculate a heat amount input to the support block based on an input current/voltage value to the Peltier element.

8. The thermal cycler of claim 1, wherein the temperature adjusting unit further comprises:

a temperature data acquisition unit, a Peltier input current and voltage detection unit;

a time integration unit, a time differentiation unit, a transfer heat calculation unit, a sample solution heat capacity calculation unit, and a sample solution temperature calculation unit.

* * * * *